(12) United States Patent
Paniccia (10) Patent No.: US 11,441,903 B2
(45) Date of Patent: *Sep. 13, 2022

(54) RING WAVEGUIDE BASED INTEGRATED PHOTONICS OPTICAL GYROSCOPE WITH GAIN TUNING FOR ENHANCED PERFORMANCE

(71) Applicant: Anello Photonics, Inc., Santa Clara, CA (US)

(72) Inventor: Mario Paniccia, Santa Clara, CA (US)

(73) Assignee: ANELLO PHOTONICS, INC., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/373,298

(22) Filed: Jul. 12, 2021

(65) Prior Publication Data
US 2021/0341289 A1    Nov. 4, 2021

Related U.S. Application Data

(63) Continuation-in-part of application No. 17/103,662, filed on Nov. 24, 2020, now Pat. No. 11,060,869.
(Continued)

(51) Int. Cl.
*G01C 19/72* (2006.01)
*G02B 6/27* (2006.01)
*G02B 6/126* (2006.01)

(52) U.S. Cl.
CPC ......... *G01C 19/727* (2013.01); *G01C 19/721* (2013.01); *G02B 6/126* (2013.01); *G02B 6/2726* (2013.01)

(58) Field of Classification Search
CPC .... G01C 19/72; G01C 19/721; G01C 19/722; G01C 19/727
See application file for complete search history.

(56) References Cited

U.S. PATENT DOCUMENTS 4,717,256 A * 1/1988 Ensley ................. G02F 1/0134
356/460
7,450,800 B2   11/2008 Barwicz
(Continued)

OTHER PUBLICATIONS

Matthew J. Grant et al. "Loss-Gain Coupled Ring Resonator Gyroscope", published at Proceedings of SPIE 10934, Optical, Opto-Atomic and Entanglement-Enhanced Precision Metrology (Mar. 4, 2019), 14 pages.
Yu-Hung Lai et al., "Enhanced sensitivity operation of an optical gyroscope near an exceptional point", Physics > Optics, arXiv.org > physics > arXiv:1901.08217, Jan. 24, 2019, 7 pages.
(Continued)

*Primary Examiner* — Michael A Lyons
(74) *Attorney, Agent, or Firm* — Lowenstein Sandler LLP; Madhumita Datta (57) ABSTRACT

An integrated photonics optical gyroscope fabricated on a silicon nitride (SiN) waveguide platform comprises a first straight waveguide to receive incoming light and to output outgoing light to be coupled to a photodetector to provide an optical signal for rotational sensing. The gyroscope comprises a first microresonator ring proximate to the first straight waveguide. Light evanescently couples from the first straight waveguide to the first microresonator ring and experiences propagation loss while circulating as a guided beam within the first microresonator ring. The guided beam evanescently couples back from the first microresonator ring to the first straight waveguide to provide the optical signal for rotational sensing after optical gain is imparted to guided beam to counter the propagation loss. In a coupled-ring configurations, the first microresonator ring acts as a loss ring, and optical gain is imparted to a second microresonator ring which acts as a gain ring.

19 Claims, 7 Drawing Sheets

Related U.S. Application Data (60) Provisional application No. 62/944,614, filed on Dec. 6, 2019, provisional application No. 62/941,251, filed on Nov. 27, 2019.

(56) References Cited

U.S. PATENT DOCUMENTS

| | | | |
|---|---|---|---|
| 10,731,988 | B1 | 8/2020 | Paniccia et al. |
| 11,060,869 | B2 * | 7/2021 | Paniccia .............. G01C 19/727 |
| 2003/0058908 | A1 | 3/2003 | Griffel |
| 2004/0150268 | A1 | 8/2004 | Garito et al. |
| 2004/0179573 | A1 | 9/2004 | Armani et al. |
| 2006/0239614 | A1 | 10/2006 | Montgomery et al. |
| 2008/0074736 | A1 | 3/2008 | Kuo et al. |
| 2011/0019955 | A1 | 3/2011 | Morton et al. |
| 2015/0295379 | A1 | 10/2015 | Ozdemir |
| 2016/0049767 | A1 | 2/2016 | Morton et al. |
| 2017/0067743 | A1 | 3/2017 | Salit et al. |
| 2017/0307375 | A1 * | 10/2017 | Bowers .................. G01C 19/66 |
| 2018/0252527 | A1 | 9/2018 | Khajavikhan |
| 2020/0249023 | A1 | 8/2020 | Digonnet |

OTHER PUBLICATIONS

Sarat Gundavarapu et al., "Sub-hertz fundamental linewidth photonic integrated Brillouin laser", https://doi.org/10.1038/s41566-018-0313-2, www.nature.com/naturephotonics, Nature Photonics, vol. 13, Jan. 2019, pp. 60-67.

Michael Digonnet, "Sensing Rotation with Light: From Fiberoptic Gyroscope to Exceptional Points", Applied Physics Department Stanford University, Stanford's 2018 PNT Symposium, Nov. 7-8, 2018, 33 pages.

Jiang Li, "Microresonator Brillouin gyroscope", Optical Society of America, vol. 4, No. 3, Mar. 2017, pp. 346-348.

PCT International Search Report and Written Opinion for International Application No. PCT/US2020/062263 dated Mar. 2, 2021, 13 pages.

Kalantarov, D. et al. "Sensitivity Limits of Coupled Resonator Optical Waveguide (CROW) Gyroscopes when Subject to Material Losses". Gyroscopy and Navigation, vol. 6, No. 1, 2015, pp. 33-40. (Year: 2015).

Yang, Zhaohua et al. "Analysis of nonreciprocal noise based on mode spitting in a high-Q optical microresonator". Laser Phys. 28, 2018, 015101, pp. 1-7. (Year: 2018).

* cited by examiner

RING WAVEGUIDE BASED INTEGRATED PHOTONICS OPTICAL GYROSCOPE WITH GAIN TUNING FOR ENHANCED PERFORMANCE

RELATED APPLICATION

This application is a continuation-in-part of U.S. patent application Ser. No. 17/103,662, filed Nov. 24, 2020, titled "Ring Waveguide Based Integrated Photonics Optical Gyroscope With Gain Tuning For Enhanced Performance," which claims the benefit of U.S. Provisional Patent Application No. 62/941,251, filed Nov. 27, 2019, entitled, "Ring Waveguide Based Integrated Photonics Optical Gyroscope," and U.S. Provisional Patent Application No. 62/944,614, filed Dec. 6, 2019, entitled, "Ring Waveguide Based Integrated Photonics Optical Gyroscope with Gain Tuning for Enhanced Performance," the entireties of which are incorporated by reference herein.

TECHNICAL FIELD

The present disclosure relates to integrated photonics-based optical gyroscopes.

BACKGROUND

Gyroscopes (also referred to in short as "gyros") are devices that can sense angular velocity. The applications of gyroscopes include, but are not limited to, military, aircraft navigation, robotics, autonomous vehicles, virtual reality, augmented reality, gaming etc. Gyroscopes can be mechanical or optical, and can vary in precision, performance, cost and size. Since optical gyroscopes do not have any moving parts, they have advantages over mechanical gyroscopes as they can withstand effects of shock, vibration and temperature variation better than the mechanical gyroscopes with moving parts. The most common optical gyroscope is the fiber optical gyroscope (FOG) that operates based on interferometric measurements of optical phase shift due to the Sagnac effect (a phenomenon encountered in interferometry that is elicited by rotation). Construction of a FOG typically involves a coil comprising several turns of polarization-maintaining (PM) fiber. Laser light is launched into both ends of the PM fiber coil so that two optical beams travel in opposite directions. If the fiber coil is moving, the optical beams traveling in opposite directions experience different optical path lengths with respect to each other. By setting up an interferometric system, one can measure the small path length difference that is proportional to the area of the loop enclosed by the turns of the fiber coil and the angular velocity of the rotating fiber coil.

However, FOGs are bulky because the Sagnac effect is relatively weak and to attain high performance, few hundreds to a few thousands of meters of fiber is needed (in the form of fiber coil with several turns). An alternative to FOG is resonant fiber optic gyroscope (RFOG) where rotation-induced resonance frequency shift due to the Sagnac effect is much more prominent that the FOGs. As a result, the required length of fiber in an RFOG is orders of magnitude smaller than a FOG. Instead of a fiber coil with several turns in a FOG, a single loop of fiber is used in an RFOG, where light circulates. Note that another resonant type gyroscope, called the Ring laser gyro (RLG) is different from RFOG and FOG in the sense that RLG does not have a fiber, and instead of a fiber, the laser beam bounces around in a solid piece of glass.

Fiber-based gyroscopes can provide very high precision, but at the same time, they are of larger footptint, are very expensive, and are hard to assemble due to the devices being built based on discrete optical components that need to be aligned precisely. Often, manual alignment is involved, which is hard to scale up for volume production.

Present inventors propose replacing fibers with waveguide based integrated photonics components for cost-effective easy integration on a semiconductor platform which is much more promising for volume production of gyroscopes.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

An integrated photonics optical gyroscope fabricated on a silicon nitride (SiN) waveguide platform comprises a first straight waveguide to receive incoming light and to output outgoing light to be coupled to a photodetector to provide an optical signal for rotational sensing. The gyroscope comprises a first microresonator ring proximate to the first straight waveguide. Light evanescently couples from the first straight waveguide to the first microresonator ring and experiences propagation loss while circulating as a guided beam within the first microresonator ring. The guided beam evanescently couples back from the first microresonator ring to the first straight waveguide to provide the optical signal for rotational sensing after optical gain is imparted to guided beam to counter the propagation loss.

In a coupled-ring configurations, the first microresonator ring acts as a loss ring, and optical gain is imparted to a second microresonator ring which acts as a gain ring.

In the coupled-ring configuration, the guided beam evanescently couples back from the second microresonator ring to the first microresonator ring, and from the first microresonator ring to the first straight waveguide to provide the optical signal for rotational sensing.

Different portions of the first microresonator ring (or a second microresonator ring) can be fabricated on the same physical layer or on different physical layers vertically stacked on top of each other. Light couples evanescently between the two vertically separated physical layers. Please note that even a single microresonator ring can have two portions fabricated in two different layers rather than having two separate microresonator rings. One portion where gain is imparted can act effectively as a "gain ring" while the entire microresonator ring acts as a loss ring. In some configurations, the entire ring can act as a gain ring as well as a loss ring.

The microresonator ring can have a racetrack-like shape, where a straight portion of the microresonator ring is parallel to and proximate to a straight waveguide that launches right.

The gyroscope may have a second straight waveguide to receive incoming pump light from one or more pump light sources, wherein the pump light provides the optical gain to counter the propagation loss. At least a portion of the first microresonator ring and/or the second microresonator ring can be implanted with erbium dopants that can be excited at a particular wavelength of pump light to provide the optical gain. The pump light is coupled to the gyroscope from at least one side to excite the erbium dopants. Alternatively, the pump light is coupled to the gyroscope from the top to excite the erbium dopants. The pump light can be at an wavelength of 980 nm or 1440-1480 nm depending on the wavelength of excitation for the erbium dopants. A pump light of suitable wavelength can be coupled to the gyroscope to induce Stimulated Raman Scattering (SRS) and/or Stimulated Brillouin Scattering (SBS) to provide the optical gain.

BRIEF DESCRIPTION OF THE DRAWINGS

The present disclosure will be understood more fully from the detailed description given below and from the accompanying drawings of various implementations of the disclosure. Please note that the dimensions shown in the figures are for illustrative purposes only and not drawn to scale.

FIG. 9 illustrates a schematic top view of a waveguide-based single microresonator ring (130) in another embodiment of an integrated photonics optical gyroscope sensing chip. Similar to the embodiment shown in FIG. 8, a first straight waveguide (115) and a second straight waveguide (215) are proximate to the microresonator ring (130). A first portion of the microresonator ring 130, shown with solid lines, can be fabricated on one layer (top layer), while a second portion of the microresonator ring 130, shown with dashed lines, can be fabricated on a different layer (a bottom layer). Additionally, a heater 780 can be fabricated on a sub-portion of the first portion of the microresonator ring to control evanescent coupling between the portions of the microresonator ring residing on the top layer and on the bottom layer.

DETAILED DESCRIPTION

Aspects of the present disclosure are directed to compact ultra-low loss silicon nitride waveguide based angular rotation sensing chip which may be integrated with other system-level integrated photonics components for optical gyroscope applications.

Figure 1A:
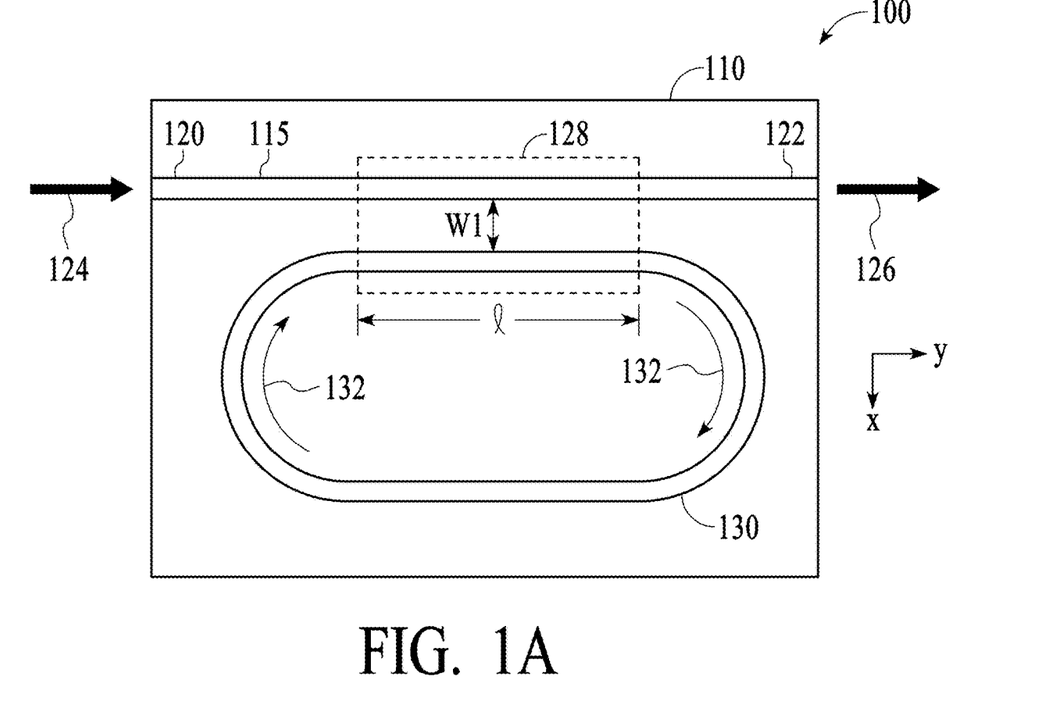
FIG. 1A illustrates a schematic top view of a waveguide-based resonant ring in an integrated photonics optical gyroscope sensing chip.

FIG. 1A is a schematic top view of embodiment 100 showing a waveguide-based sensing chip 110 having an input/output waveguide 115 and a waveguide-based resonant ring 130 that collectively replace a fiber coil of a FOG or a fiber loop of an RFOG. The combination of the input/output waveguide 115 and the waveguide-based resonant ring 130 is sometimes called a microresonator because of the small size. An integrated photonics front-end chip (not shown) may be coupled with the waveguide-based sensing chip 110 to constitute an integrated photonics optical gyroscope module which may be part of an inertial measurement unit (IMU) package. Note that IMU may have other components, such as accelerometers, in addition to the optical gyroscope module. Therefore, making the optical gyroscope module compact reduces the overall size, weight power and cost of the IMU. This weight reduction can be crucial for certain applications, for example, lightweight unmanned aerial vehicles. IMU may be a much-needed technology component for working in conjunction with more established sensing technologies for autonomous vehicles, such as LiDAR (Light Detection and Ranging), radar and cameras that will be used in future generation of autonomous vehicles (both terrestrial and aerial).

Figure 1B:
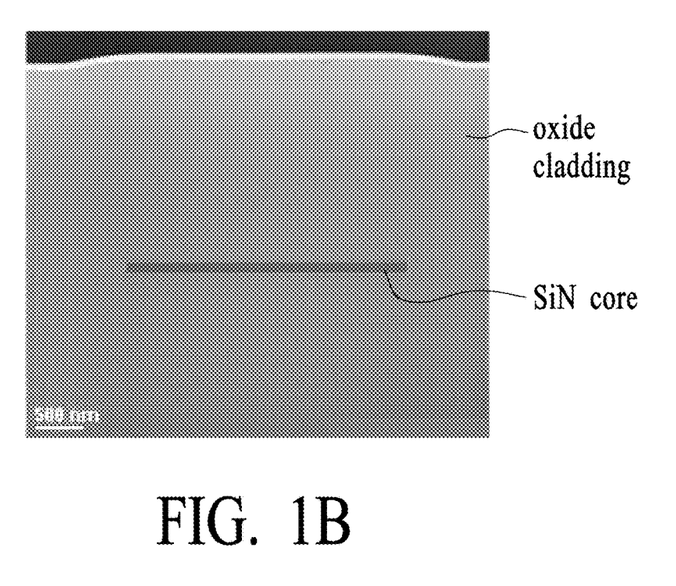
FIG. 1B shows a transmission electron micrograph of a silicon nitride waveguide used to construct the loss ring and the gain ring of the gyroscope, according to this disclosure. The gain ring may have erbium doping in it or other optically enhanced gain material.

In the waveguide-based sensing chip 110 (sometimes also referred to as a "gyro chip"), low-loss waveguide core may be made of silicon nitride ($Si_3N_4$, which is simply referred to as SiN) and the waveguide cladding may be made of fused silica or oxide. FIG. 1B shows a longitudinal cross-sectional image of a waveguide chip obtained by a transmission electron microscope (TEM), showing a silicon nitride core surrounded by oxide cladding from the top, bottom and both sides. This waveguide structure is also referred to simply as SiN waveguide, and a chip containing the SiN waveguide is referred to as a SiN waveguide chip. Note that waveguide based components on a front-end chip (which may have an on-chip light source, such as a laser, or may guide light coupled from an off-chip light source) may be based on Si or III-V compound semiconductor, or a combination thereof, and may be mode-selective, as described in earlier-filed co-owned provisional patent application 62/904,443 filed on Sep. 23, 2019, titled, "System Architecture for Silicon Photonics Optical Gyroscopes with Mode-Selective Waveguides," which was converted to non-provisional application Ser. No. 16/659,424, entitled, "System Architecture for Integrated Photonics Optical Gyroscopes," filed Oct. 21, 2019, which eventually issued as U.S. Pat. No. 10,731,988 on Aug. 4, 2020. These applications are also incorporated herein by reference in their entireties.

Alternatively, the waveguide based components of the front end chip may be made of SiN also in an all-integrated embodiment, as described in earlier-filed co-owned provisional patent application No. 62/934,184, entitled, "Multilayer Silicon Nitride Waveguide Based Integrated Photonics Optical Gyroscopes," filed Nov. 12, 2019, which was converted into non-provisional application Ser. No. 17/095,272, entitled, "Multi-Layer Silicon Nitride Waveguide Based Integrated Photonics Optical Gyroscope Chip," filed Nov. 11, 2020. These applications are also incorporated by reference in their entireties.

Referring back to FIG. 1A, incoming guided light 124 from a light source (such as a laser, which is not shown) at a signal wavelength $\lambda_s$ may be coupled to an input end 120 of the waveguide 115. A portion of the incoming guided light 124 is evanescently coupled to the resonant ring 130 and circulates within the resonant ring 130 several times as guided light 132 before coupling back to waveguide 115 and propagating towards the output end 122 of the waveguide 115. Outgoing guided light 126 may be detetcted by a detector (e.g., PID photodetector or avalanche photodiode, not shown in the figure). The resonant ring 130 may have any geometric contour (e.g., a circle, an oval, a race track shape etc.). The illustrative examples shown in the figures show a race track shape for the ring. Since in a racetrack shape, the separation 'w1' between the waveguide 115 and the resonant ring 130 can be kept substantially constant for coupling length 'l' bounded by the dashed rectangle 128, the evanescent resonant coupling can be optimized by proper design. Note signal can be put into both directions, as shown in FIG. 2B.

Figure 2A:
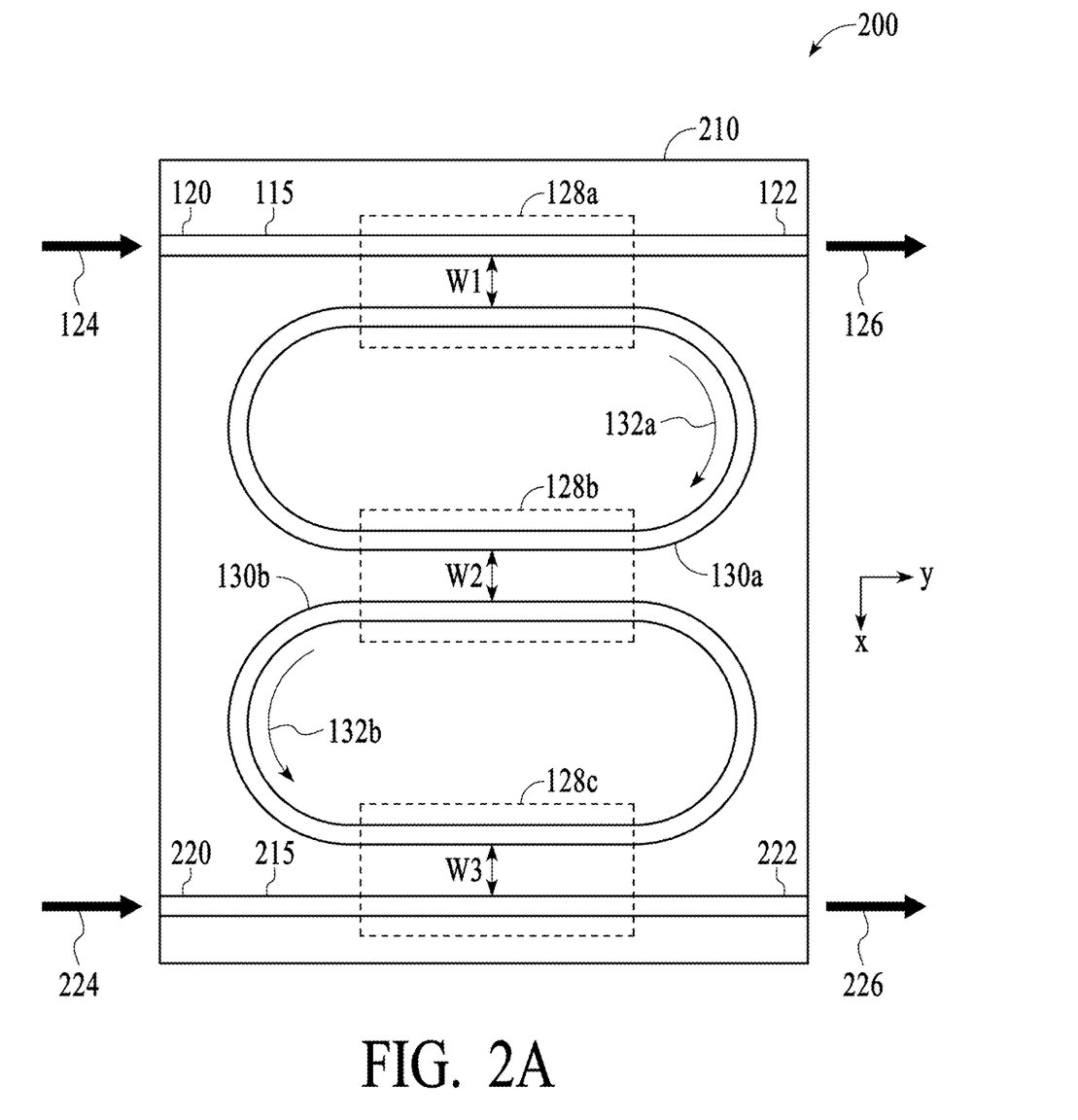
FIG. 2A illustrates a schematic top view of two waveguide-based resonant rings (one loss ring and one gain ring) coupled to each other in a coupled-ring integrated photonics optical gyroscope sensing chip, according to an embodiment of the present disclosure.

FIG. 2A illustrates a schematic top view of embodiment 200, where instead of just one waveguide ring, as shown in FIG. 1A, two resonant waveguide rings (one loss ring 130a and one gain ring 130b) are coupled to each other in a coupled-ring integrated photonics optical gyroscope sensing chip 210. Recently, it has been theoretically shown that the Sagnac frequency shift of a coupled-ring integrated photonics optical gyroscope could be up to $10^8$ times that of its single-ring counterpart when the loss ring and the gain ring are operated at a critical operating condition known as the "exceptional point." Interested readers are referred to a scholarly journal article, entitled, "Loss-Gain Coupled Ring Resonator Gyroscope" authored by Matthew J. Grant and Michael J. F. Digonnet, published at Proceedings of SPIE 10934, Optical, Opto-Atomic and Entanglement-Enhanced Precision Metrology (4 Mar. 2019). This paper also shows simulation results demonstrating that maximum rotation sensitivity of the coupled-ring gyroscope structure is not achieved at the exceptional point, but away from the exception point at an optimum value of inter-ring coupling. Controlling the loss and gain in the two waveguide rings is therefore critical in achieving the optimum inter-ring coupling and in turn, achieving the desired rotation sensitivity.

Figure 4:
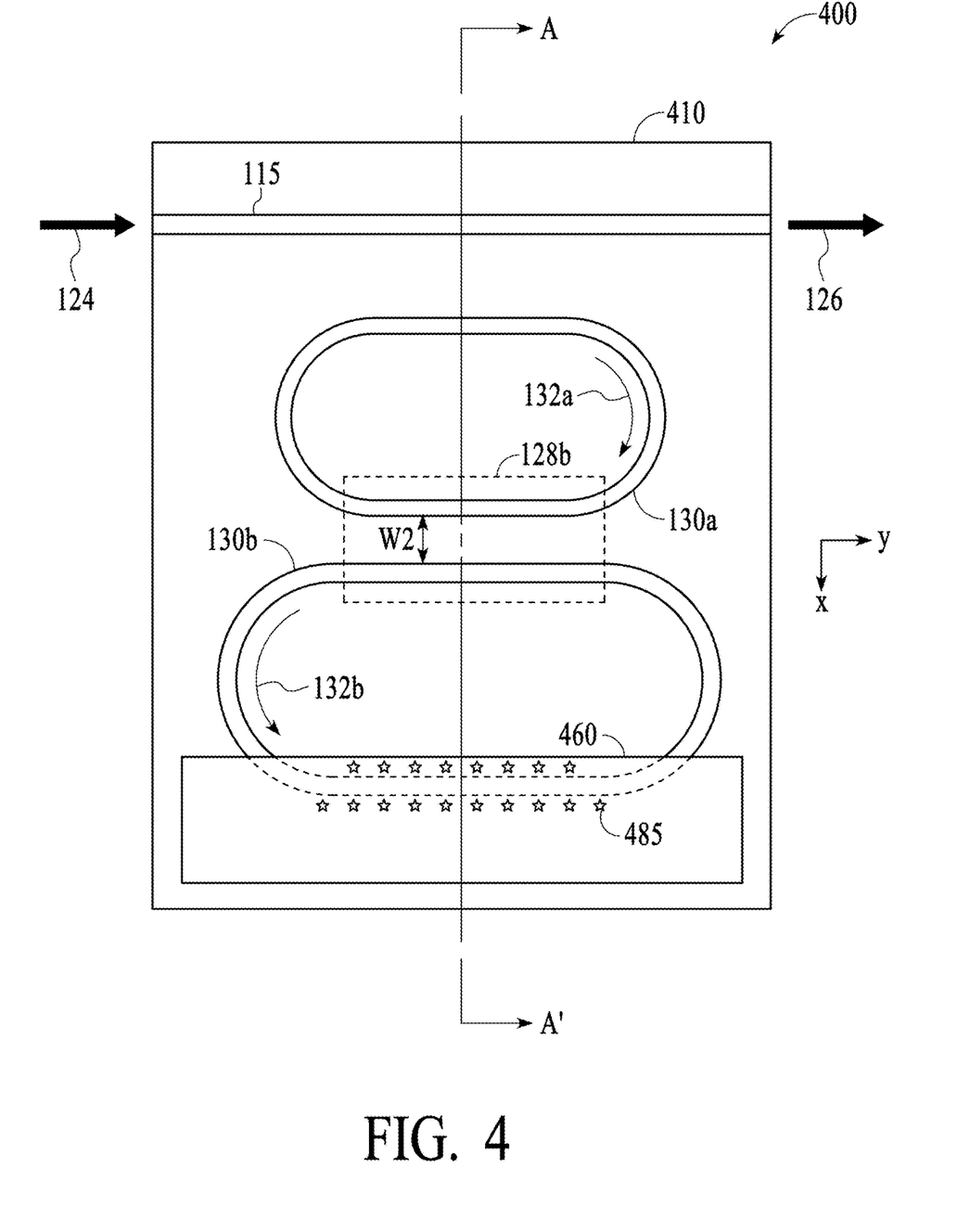
FIG. 4 schematically illustrates the top view of a pump laser integrated from the top to stimulate erbium dopants locally in a portion of the gain ring that is located on the same layer with the loss ring, according to an embodiment of the present disclosure.
Figure 5:
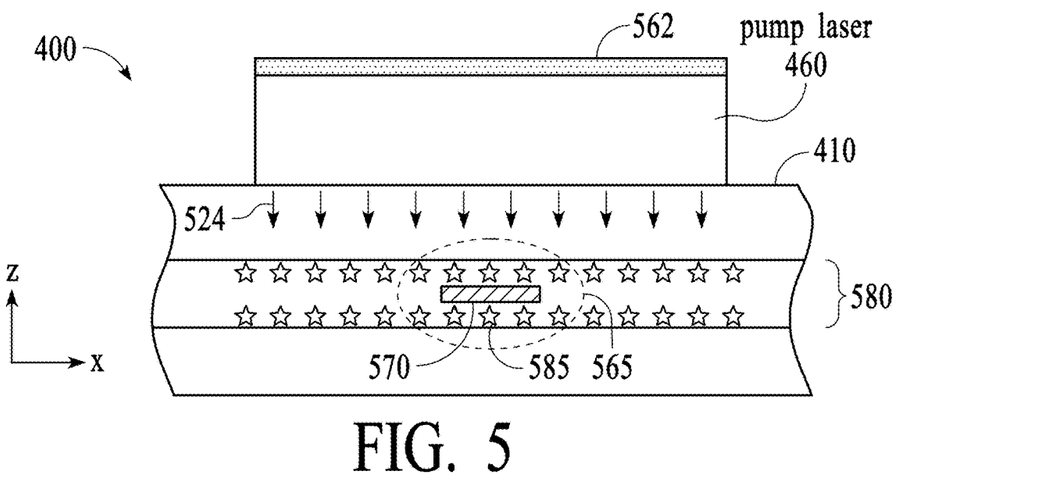
FIG. 5 schematically illustrates the side view of the configuration shown in FIG. 4.
Figure 6:
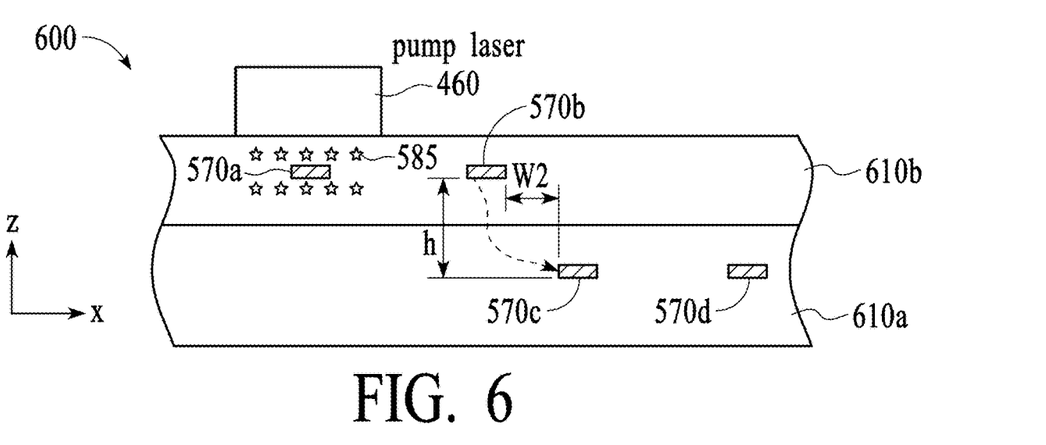
FIG. 6 schematically illustrates the side view of a pump laser integrated from the top to stimulate erbium dopants locally in a portion of the gain ring that is located on a different layer than the loss ring, according to an embodiment of the present disclosure.

The present inventors propose various embodiments of the coupled-ring gyroscope based on silicon nitride waveguide-based loss ring and gain ring. Note that the dimensions of the loss ring 130a and 130b do not have to be identical. An example of non-identical ring shapes is shown in FIG. 4. The ring shapes are designed to optimize the coupling between the two rings separated by lateral distance 'w2' within the dashed area 128b, as well as to optimize coupling between loss ring 130a and waveguide 115 separated by lateral distance 'w1' within the dashed area 128a, and coupling between gain ring 130b and waveguide 215 separated by lateral distance 'w3' within the dashed area 128c. Direction of guided light beam 132a within the loss ring 130a is opposite to the direction of guided light beam 132b within the gain ring 130b. To introduce optical gain to guided light beam 132b, pump laser light 224 at a target wavelength may be launched into the input end 220 of waveguide 215. The wavelength of pump laser light 224 may be chosen such that the wavelength of amplified light coupled from waveguide 215 to gain ring 130b is equal to the signal wavelength $\lambda_s$ of the laser light launched at the input end 120 of waveguide 115. Signal wavelength $\lambda_s$ may be 1550 nm or some other wavelength for which the waveguide loss is optimized by design. The wavelength of the amplified light may be a Raman-shifted or Brillouin-shifted emission wavelength or harmonic thereof depending on whether a pump laser is used to induce Stimulated Raman Scattering (SRS) or Stimulated Brillouin Scattering (SBS) as the gain mechanism. In certain embodiments where the gain ring 130b is doped with erbium (similar to erbium doped fiber amplifier (EDFA)), the pump laser wavelength does not need to match the signal wavelength $\lambda_s$, but need to stimulate the erbium dopant ions at for example ~980 nm. (note that the exact wavelength needed for stimulating erbium will depend on the type of erbium used.) Note that the other typical wavelength for pumping could be in the 1440-1480 nm range. That range of wavelength may be more practical for pumping from the side (as shown in FIGS. 2A and 2B) rather than pumping from the top (as shown in FIGS. 4-6). In another embodiment both a pump laser used to induce SRS or SBS and a 980 nm pump laser to excite erbium dopant ions can be used together to further enhance the signal and the system performance. This concept is further elaborated with respect to FIGS. 4 and 5 below. Since the dimension of the waveguide in the gain ring 130b may not be optimized to guide 980 nm wavelength at low loss, in certain embodiments, more than one pump lasers may be coupled at the waveguide input end 220—one pump laser at 980 nm and another pump laser to generate an amplified light wavelength equal to signal wavelength $\lambda_s$. The output end 222 of waveguide 215 may be blocked, or outgoing light 226 may lead to a detector to measure how much optical power is coupled into the gain ring 130b.

Figure 2B:
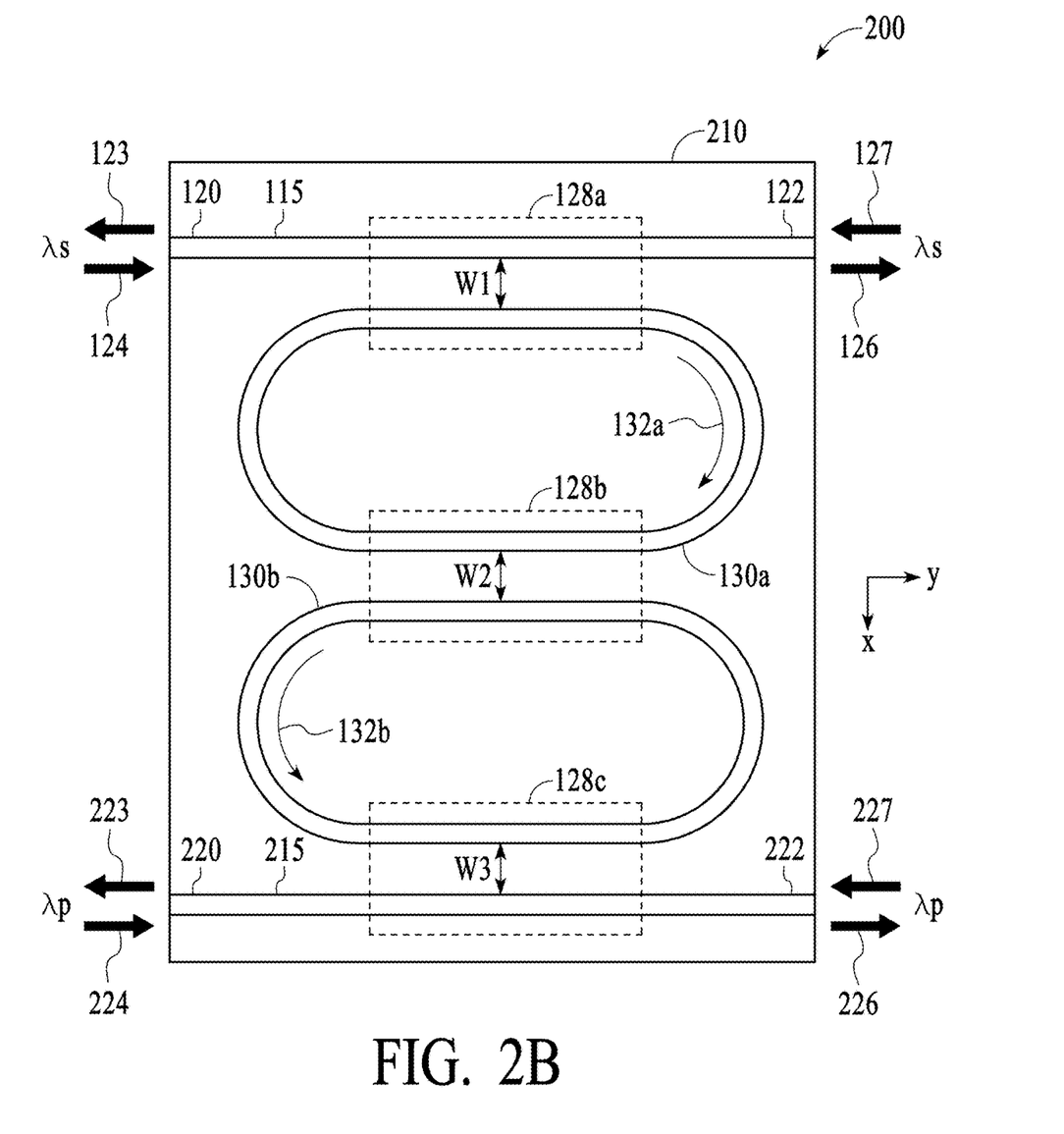
FIG. 2B illustrates a schematic view of two waveguide based resonant rings (one loss and one gain ring) coupled to each other in a coupled-ring integrated photonics optical gyroscope sensing chip, where laser light with signal wavelength and pump wavelength are launched from both ends of the sensing chip, according to another embodiment of the present disclosure

FIG. 2B shows another embodiment similar to FIG. 2A, but in this embodiment the laser light for both signal wavelength $\lambda_s$ and pump wavelength $\lambda_p$ can be input from both sides of the chip 210. The incoming guided light with wavelength $\lambda_s$ can come from the same laser source or front-end chip that is split into two beams (124 and 127) via a splitter. In addition light from the pump laser with wavelength $\lambda_p$ that is optimized for either SBS or SRS can also be pumped in as beams 224 and 227 from both sides of the ring to provide double the gain in the system and also to insure that both directions of the signal passing through the gain ring see the same amplications. Alternatively, beam 224 may have a wavelength to excite erbium dopant ions (as explained below) and beam 227 may have a wavelength suitable for inducing SRS or SBS. In general, pumping from both sides of the ring (i.e. double pumping) allows for the laser signal to rotate through the rings in both directions similar to a standard FOG (where light is launched from both directions in a fiber coil). This is why a pump wavelength of 1440-1480 nm be convenient to produce the desired results.

Both of these circulating beams will then see the same temperature effect, same path length and other system imparities. However the resonant shift will be different depending on which direction the system rotates. This allows one to cancel out other effects and insure the signal that is being measured is from the Sagnac effect.

Note that FIGS. 2A and 2B illustrate two rings (loss ring and gain ring) fabricated on the same layer of chip 210 and ring-to-ring evanescent coupling occurs laterally on a same lateral plane. However, in alternative embodiments, ring-to-ring evanescent coupling may occur vertically in a longitudinal plane (as shown in the example in FIG. 6) when the loss ring and gain ring are fabricated in two separate layers. Also, please note that even a single microresonator ring can have two portions fabricated in two different layers rather than having two separate microresonator rings. One portion where gain is imparted can act effectively as a "gain ring" while the entire microresonator ring acts as a loss ring. In some configurations, the entire ring can act as a gain ring as well as a loss ring.

Figure 3:
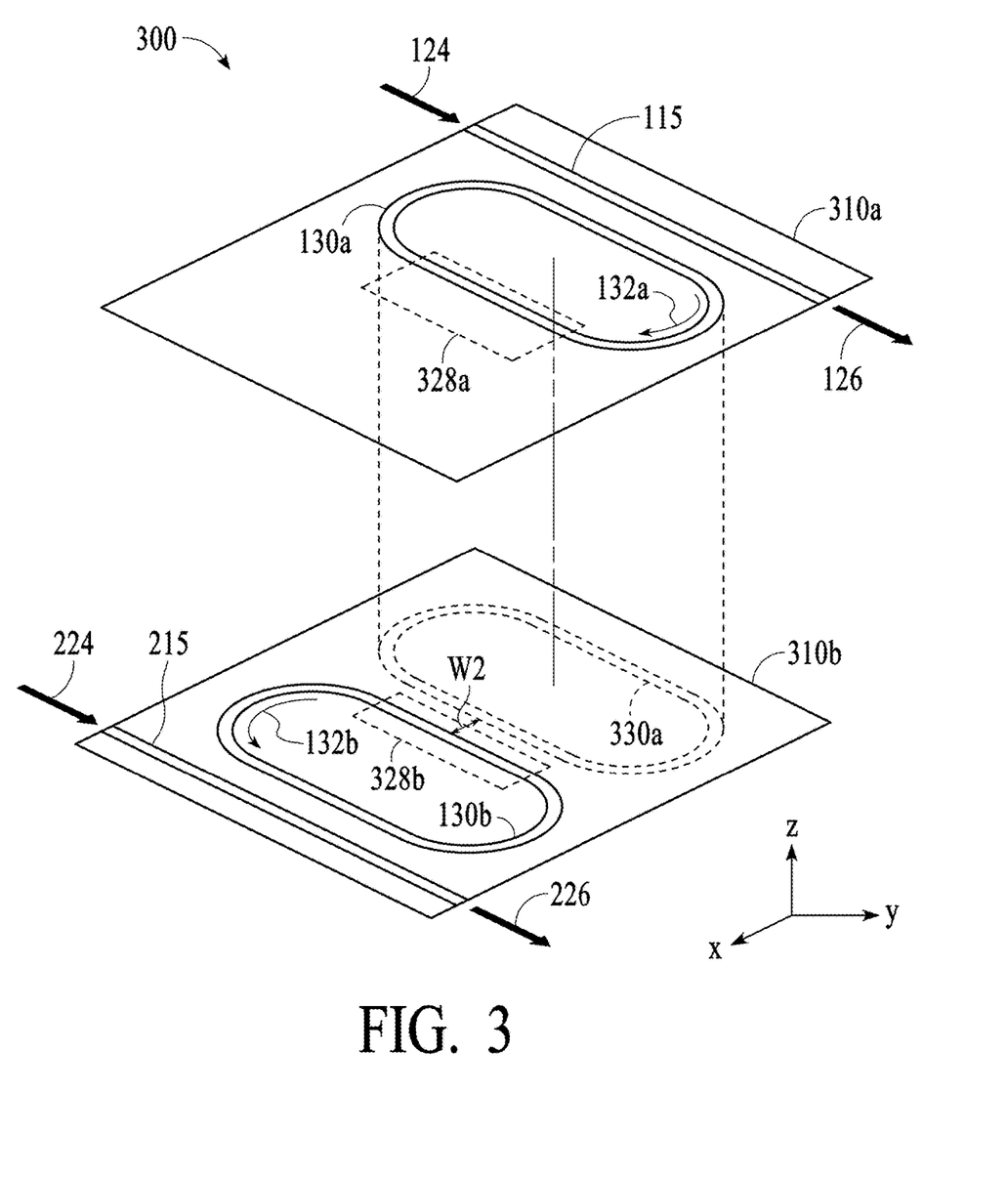
FIG. 3 illustrates the concept central to fabricating a multi-layer waveguide based integrated photonics optical gyroscope, where the loss ring and the gain ring are in two different layers, according to an embodiment of the present disclosure.

FIG. 3 shows an embodiment 300 showing a first layer 310*a* with the loss ring 130*a* and a second layer 310*b* with the gain ring 130*b*. To illustrate that the two rings may be separated along the lateral direction (x-direction) by an amount of 'w2' (where 'w2' may be zero) the projection of loss ring 130*a* is shown in the form of a dashed contour 330*a* on layer 310*b*. Evanescent vertical coupling of guided light beams 132*a* and 132*b* occurs between the portion of the loss ring 130*a* within the dashed outline 328*a* on layer 310*a* and the portion of the gain ring 130*b* within the dashed outline 328*b* on layer 310*b*. Note that in some embodiments, the gain ring may be on the top layer while the loss ring is on the bottom layer.

FIG. 4 and FIG. 5 show an embodiment 400 where the waveguide core region of the gain ring 130*b* is implanted with erbium dopant ions which may be stimulated with the appropriate pump laser wavelength of 980 nm or 1440 nm. Specifically, FIG. 4 shows the top view of a sensing chip 410 (similar to sensing chip 210 in FIG. 2), and FIG. 5 shows portion of a longitudinal cross-section of the chip 410 along the cutline AA' shown in FIG. 4. Note that FIG. 4 has many components similar to FIG. 2, but instead of using an additional waveguide 215 to launch pump laser light from the edge, as in the case of the sensing chip 210, a pump laser 460 is coupled from the top of the sensing chip 410. The portion of gain ring 130*b* that is directly beneath the pump laser 460 receives laser light 524 (not shown in FIG. 4, but shown in FIG. 5) that stimulates the erbium dopant ions 485 (the star-shapes indicate stimulated erbium ions) around the waveguide's SiN core 570 and amplifies light beam 132*b* circulating in the gain ring 130*b*.

As FIG. 5 shows the depth at which erbium dopants are injected (mostly confined within the implant region 580, which is not a separate material layer, but indicates the portion of the waveguide cladding having the erbium ions) is determined by the depth at which the waveguide core 570 of the gain ring 132*b* resides from the top surface of chip 410. A mirror 562 may be fabricated on top of the pump laser 460, so that the light 524 at wavelength of 980 nm is pumped into the chip 410 to stimulate the erbium dopant ions in the implant layer 580. Since most of the optical mode (shown by dashed oval 565) is outside of the SiN core 570, stimulated erbium ions 585 spatially within the optical mode are capable of imparting optical amplification to the guided beam 132*b* in the gain ring 130*b*.

In some embodiments, optical gain is introduced only at a portion of the gain ring 130*b* that is directly under the pump laser and is away from ring-to-ring coupling area 128*b*, as shown in FIG. 4. In certain other embodiments, the entire gain ring 130*b* may be under the pump laser 460.

In case of a multi-layer configuration, the gain ring may be on the top and the loss ring may be on the bottom. For example, in the embodiment 600 shown in FIG. 6, a longitudinal cross-section of a sensing chip is shown, where the top layer 610*b* has the gain ring 130*b* (i.e., SiN waveguide cross sections 570*a* and 570*b* belong to gain ring 130*b*), and the bottom layer 610*a* has the loss ring 130*a* (i.e., SiN waveguide cross sections 570*c* and 570*d* belong to loss ring 130*a*). Note that waveguide cross sections 570*b* and 570*c* may be aligned with respect to each other for optimum vertical coupling between the gain ring and the loss ring. For example, 'w2' can be zero or even a negative number. The coupling efficiency also depends on the vertical separation 'h'.

Figure 7:
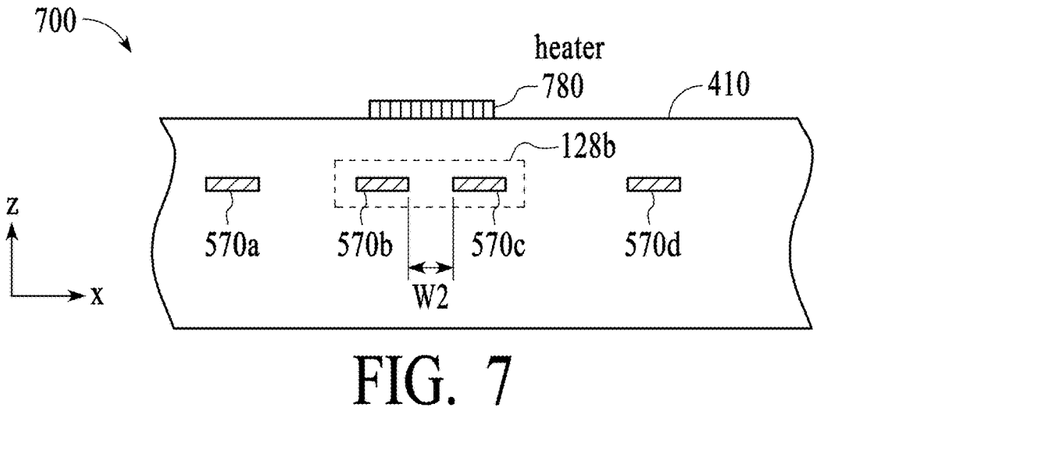
FIG. 7 schematically illustrates integration of a heater to vary the amount of evanescent coupling between the loss ring and the gain ring, according to an embodiment of the present disclosure.
Figure 8:
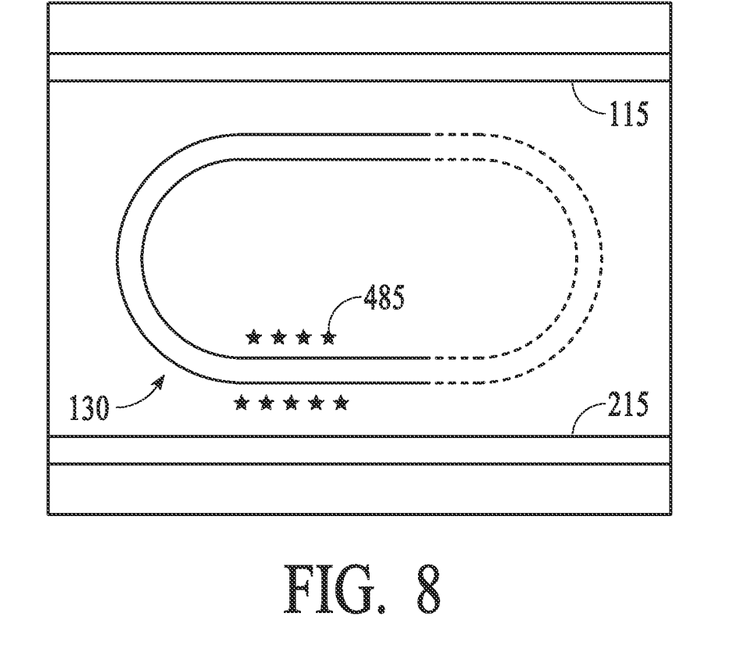
FIG. 8 illustrates a schematic top view of a waveguide-based single microresonator ring (130) in one embodiment of an integrated photonics optical gyroscope sensing chip. A first straight waveguide (115) and a second straight waveguide (215) are proximate to the microresonator ring (130). A first portion of the microresonator ring 130, shown with solid lines, can be fabricated on one layer, while a second portion of the microresonator ring 130, shown with dashed lines, can be fabricated on a different layer. Additionally, a sub-portion of the first portion of the microresonator ring fabricated on the top layer can be doped with erbium dopant ions (485) to impart optical gain.
Figure 9:
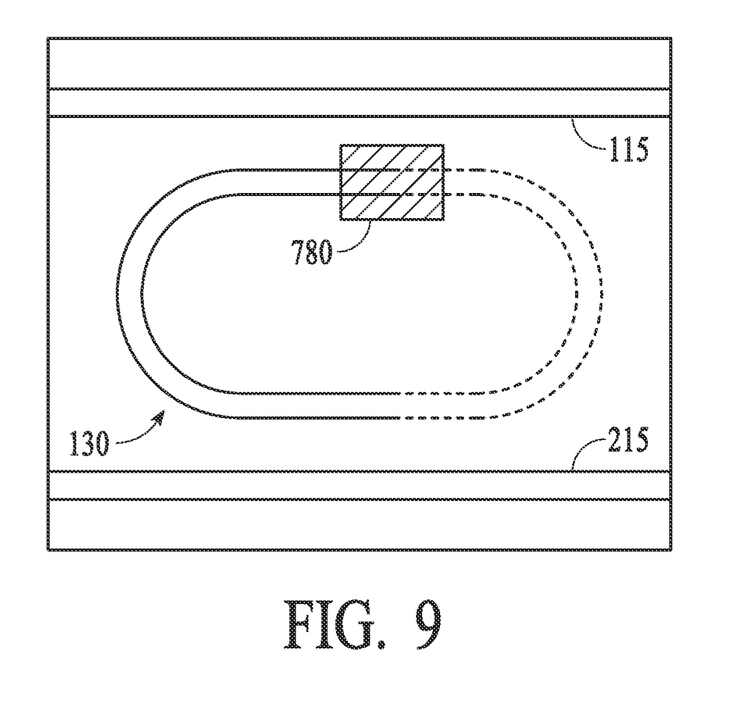

FIG. 7 shows an embodiment 700 where a heater 780 is fabricated covering the coupling area 128*b* on the top surface of a sensing chip 410 (whose longitudinal cross-section is shown in the Figure). This particular example shows a single-layer configuration like FIG. 4, where both the gain ring (waveguides 570*a* and 570*b*) and the loss ring (waveguides 570*c* and 570*d*) are in the same layer. The gain ring may be pumped from the top or from the side for optical amplification at the signal wavelength. Controlling the power of the heater 780, the amount of coupling between the gain ring and the loss ring may be controlled. In addition the same concept of a metal heater could be deployed on the other rings above the regions W1 and W3 to adjust the amount of coupling into and out of the rings.

Note that though in the figures the pump laser is shown as die-attached or bonded on top of the layer with the gain ring, in certain embodiments, the pump laser may be grown or monolithically integrated to the rest of the sensing chip as a top-most third layer or edge coupled.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense. Additionally, the directional terms, e.g., "top", "bottom" etc. do not restrict the scope of the disclosure to any fixed orientation, but encompasses various permutations and combinations of orientations.

What is claimed is:

1. An integrated photonics optical gyroscope fabricated on a silicon nitride (SiN) waveguide platform, comprising:
   a first straight waveguide to receive incoming light from one or more light sources and to output outgoing light to be coupled to a photodetector to provide an optical signal for rotational sensing; and
   a first microresonator ring proximate to a portion of the first straight waveguide, wherein light evanescently couples from the portion of the first straight waveguide to the first microresonator ring and experiences propagation loss while circulating as a guided beam within the first microresonator ring,
   wherein the guided beam evanescently couples back from the first microresonator ring to the portion of the first straight waveguide to provide the optical signal for rotational sensing after optical gain is imparted to the guided beam in at least a portion of the first microresonator ring to counter the propagation loss, wherein a first portion of the first microresonator ring and a second portion of the first microresonator ring are fabricated on different physical layers vertically stacked on top of each other, and wherein light couples evanescently between the two physical layers that are vertically separated.

2. The integrated photonics optical gyroscope of claim 1, wherein the one or more light sources are at one end of the first straight waveguide or at both ends of the first straight waveguide.

3. The integrated photonics optical gyroscope of claim 2, wherein a pump light of suitable wavelength is coupled to the first microresonator ring to induce Stimulated Raman Scattering (SRS) to provide the optical gain.

4. The integrated photonics optical gyroscope of claim 2, wherein a pump light of suitable wavelength is coupled to the first microresonator ring to induce Stimulated Brillouin Scattering (SBS) to provide the optical gain.

5. The integrated photonics optical gyroscope of claim 1, further comprising:
a second straight waveguide to receive incoming pump light from one or more pump light sources, wherein a portion of the second straight waveguide is proximate to the first microresonator ring, and wherein the pump light provides the optical gain to counter the propagation loss.

6. The integrated photonics optical gyroscope of claim 5, wherein at least a portion of the first microresonator ring is implanted with erbium dopants that can be excited at a particular wavelength of pump light to provide the optical gain.

7. The integrated photonics optical gyroscope of claim 6, wherein the pump light is coupled to the first microresonator ring from the second straight waveguide to which the pump light is launched from one end or from both ends.

8. The integrated photonics optical gyroscope of claim 6, wherein an additional source of a pump light is disposed on top of a portion of the first microresonator ring that is implanted with the erbium dopants that can be excited at a particular wavelength of the pump light to provide the optical gain.

9. The integrated photonics optical gyroscope of claim 8, wherein a mirror is fabricated on top of the additional source of the pump light to enhance vertical injection of pump light towards the erbium dopants.

10. The integrated photonics optical gyroscope of claim 8, wherein a first pump light is coupled to the first microresonator ring from at least one side, and a second pump light is coupled to the first microresonator ring from the top.

11. The integrated photonics optical gyroscope of claim 1, wherein a heater is fabricated on top of the top vertical layer of the different physical layers to tune amount of evanescent coupling between the first portion of the first microresonator ring and the second portion of the first microresonator ring.

12. The integrated photonics optical gyroscope of claim 1, wherein at least a portion of the first microresonator ring is implanted with erbium dopants that can be excited at a particular wavelength of pump light to provide the optical gain by inducing optical resonance.

13. The integrated photonics optical gyroscope of claim 1, wherein the first microresonator ring is in a shape of a racetrack comprising:
a first straight portion with a first end and a second end;
a second straight portion with a first end and a second end, wherein the second straight portion is parallel to the first straight portion;
a first curved portion adjoining the first end of the first straight portion to the first end of the second straight portion; and
a second curved portion adjoining the second end of the first straight portion to the second end of the second straight portion.

14. The integrated photonics optical gyroscope of claim 13, wherein the optical gain is imparted the second straight portion of the first microresonator ring.

15. The integrated photonics optical gyroscope of claim 13, wherein the first straight portion of the first microresonator ring is proximate to and parallel to the first straight waveguide to facilitate evanescent coupling of light between the first straight waveguide and the first straight portion of the first microresonator ring.

16. The integrated photonics optical gyroscope of claim 13, further comprising:
a second microresonator ring proximate to the second straight portion of the first microresonator ring, wherein the guided beam evanescently couples from the second straight portion of the first microresonator ring to a portion of the second microresonator ring and experiences optical gain to counter propagation loss within the first microresonator ring and the second microresonator ring.

17. The integrated photonics optical gyroscope of claim 16, wherein the optical gyroscope operates in a coupled-ring configuration, wherein the guided beam evanescently couples back from the second microresonator ring to the second straight portion of the first microresonator ring, and from the first straight portion of the first microresonator ring to the portion of the first straight waveguide to provide the optical signal for rotational sensing.

18. The integrated photonics optical gyroscope of claim 16, wherein the first microresonator ring and the second microresonator ring are fabricated on different physical layers vertically stacked on top of each other, and wherein light couples evanescently between the two physical layers that are vertically separated.

19. The integrated photonics optical gyroscope of claim 16, wherein at least a portion of the second microresonator ring is implanted with erbium dopants that can be excited at a particular wavelength of pump light to provide the optical gain.

* * * * *